(12) United States Patent
Coombes et al.

(10) Patent No.: US 11,038,715 B2
(45) Date of Patent: Jun. 15, 2021

(54) SYSTEM AND METHOD FOR IDENTIFYING SPECIFIC/BEST PATH IN A MESH NETWORK

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 16/369,826

(22) Filed: Mar. 29, 2019

(65) Prior Publication Data

US 2019/0245716 A1  Aug. 8, 2019

Related U.S. Application Data

(63) Continuation-in-part of application No. 16/264,915, filed on Feb. 1, 2019.

(60) Provisional application No. 62/627,215, filed on Feb. 7, 2018, provisional application No. 62/649,873, filed on Mar. 29, 2018.

(51) Int. Cl.
| | |
|---|---|
| *H04L 12/46* | (2006.01) |
| *H04L 12/911* | (2013.01) |
| *H04W 4/80* | (2018.01) |
| *H04B 10/116* | (2013.01) |
| *H04L 29/08* | (2006.01) |

(52) U.S. Cl.
CPC ........ *H04L 12/4633* (2013.01); *H04L 47/825* (2013.01); *H04B 10/116* (2013.01); *H04L 67/12* (2013.01); *H04W 4/80* (2018.02)

(58) Field of Classification Search
CPC ......... H04L 12/12; H04L 45/02; H04L 12/44; H04L 45/34; H04L 47/724; H04W 84/18; H04W 40/28
See application file for complete search history.

(56) References Cited

U.S. PATENT DOCUMENTS

| | | | |
|---|---|---|---|
| 8,085,792 B1 * | 12/2011 | Aly | ......................... H04L 45/00 370/310 |
| 8,160,096 B1 | 4/2012 | Anburaj | |
| 9,398,568 B2 | 7/2016 | Görgen et al. | |
| 9,473,393 B2 | 10/2016 | Van Der Stok | |
| 9,565,065 B2 | 2/2017 | Kelsey | |
| 2007/0161352 A1* | 7/2007 | Dobrowski | ............. H04L 41/12 455/69 |

(Continued)

*Primary Examiner* — Hassan Kizou
*Assistant Examiner* — Abdullahi Ahmed
(74) *Attorney, Agent, or Firm* — McBee Moore & Vanik IP, LLC

(57) ABSTRACT

According to some embodiments, a system and method for determining a best path in a mesh network is disclosed. The method comprises collecting path information from a plurality of nodes in a mesh network during normal network operation of the mesh network. A first of the plurality of nodes is associated with an application that transmits high-density data packets and a second of the plurality of nodes in the mesh network is to function as a target station for receiving the high-density data packets. A best path to transmit the high-density data packets to the target station based on the collected path information is determined and the best path is transmitted to the plurality of nodes in the mesh network for initiating transmission of the high-density data packets to the target station via the best path.

19 Claims, 9 Drawing Sheets

(56) References Cited

U.S. PATENT DOCUMENTS

| | | |
|---|---|---|
| 2007/0214280 A1 | 9/2007 | Patel et al. |
| 2008/0170550 A1 | 7/2008 | Liu et al. |
| 2009/0268677 A1 | 10/2009 | Chou et al. |
| 2011/0210816 A1 | 9/2011 | Wang |
| 2014/0112126 A1 | 4/2014 | Claessens et al. |
| 2015/0188949 A1* | 7/2015 | Mahaffey ................ H04L 63/20 726/1 |
| 2016/0007185 A1 | 1/2016 | Zhu et al. |
| 2018/0091407 A1 | 3/2018 | Tervonen et al. |
| 2018/0152406 A1 | 5/2018 | Kuo et al. |
| 2018/0220283 A1* | 8/2018 | Condeixa .......... H04W 28/0215 |
| 2018/0376317 A1* | 12/2018 | Kim ........................ H04L 63/08 |

* cited by examiner

Fully Connected Mesh Network (Prior Art)

Partially Connected Mesh Network (Prior Art)

Packet Structure

700

┌─────────────────────────────────────────────┐
│ Determine Best/Specific Path To Send/Receive Data Packets Of High Bandwidth Application Via A Network Protocol In A Mesh Network From A Originator Station To A Target Station │ 710
└─────────────────────────────────────────────┘
                    ↓
┌─────────────────────────────────────────────┐
│ Identify And Collect Path Information To Receive Data Packets From Every Node Of Mesh During Normal Operations By Measuring: │ 720
│ a) Time of Arrival b) Time of Origination c) Path Distance d) Transfer Time │
└─────────────────────────────────────────────┘
                    ↓
┌─────────────────────────────────────────────┐
│ Identify A High Density Data Packets Originated from the Originator Station │ 730
└─────────────────────────────────────────────┘
                    ↓
┌─────────────────────────────────────────────┐
│ Assign Best/Specific Path Via Nodes To Receive High Density Data Packets From The Originator Station To The Target Station Based On The Collected Path Information │ 740
└─────────────────────────────────────────────┘
                    ↓
                   (A)

FIG. 7A

SYSTEM AND METHOD FOR IDENTIFYING SPECIFIC/BEST PATH IN A MESH NETWORK

CROSS-REFERENCE TO RELATED APPLICATIONS

This application is a continuation-in-part of and claims priority to U.S. patent application Ser. No. 16/264,915 filed Feb. 1, 2019, which claims the benefit of U.S. Provisional Patent Application No. 62/627,215 filed Feb. 7, 2018. This application claims the benefit of U.S. Provisional Patent Application No. 62/649,873 filed Mar. 29, 2018. The entire contents of each of the applications listed above are incorporated herein by reference.

BACKGROUND

In communication networks, a node may include a redistribution point (e.g. data communication equipment) or a communication endpoint (e.g. data terminal equipment). A mesh network is a local network topology in which infrastructure nodes (i.e. bridges, switches and other infrastructure devices) connect directly, dynamically and non-hierarchically to as many other nodes as possible and cooperate with one another to efficiently route data from/to clients. In a fully connected mesh network, such as network 210 illustrated in FIG. 2A, every node may be interconnected. The simplest fully connected network is a two-node network. In a partially connected network, such as network 220 illustrated in FIG. 2B, certain nodes may be connected to exactly one other node while other nodes are connected to two or more other nodes via a point-to-point link. This may make it possible to make use of some of the redundancy of mesh topology that is physically fully connected, without the expense and complexity required for a connection between every node in the network. Mesh networks are growing in size as industrial, lighting, smart home and other Internet of Things (IoT) applications are taking advantage of them with multitudes of sensors and other devices.

BLUETOOTH mesh networks are one such network type. These networks make use of messages called heartbeats that are transmitted by nodes periodically. A heartbeat message may indicate to other nodes in the network that the node sending the heartbeat is still active. In addition, heartbeat messages may contain data which may allow receiving nodes to determine how far away a sender is in terms of a number of hops required to reach the sender. The use of heartbeat messages may be associated with a time to live (TTL) field within a network packet. TTL may control a maximum number of hops over which a message will be relayed. Setting the TTL may allow nodes to exercise control over relaying and conserve energy, by ensuring messages are not relayed further than is required. Furthermore, each node may implement a cache that contains all recently seen messages and if a message is found to be in the cache this is an indication that the node has seen and processed the message.

Deploying large density mesh networks inevitably leads to an increase in interference, as sensor nodes and other nodes are constantly sending messages across the network. In large density mesh networks, data packets may travel through and hop across many intermediate nodes. For example, data may have to hop more than ten or more nodes to reach a destination. For every hop in the mesh network, a transfer speed of a data packet transfer may be significantly lessened. If the data packet originated from a high bandwidth application or originator station, a transmission time to reach the target station may be severely diminished. Applications may need higher bandwidth for short periods of time but with varying frequency of occurrence. For example, when sending video data, which requires a high frame rate, a mesh network by its very nature may make it difficult to prioritize messages getting through the network due to the competing messages broadcasting through the network. Furthermore, as mesh networks grow in size and are deployed in a relatively close space, there is a substantial increase in a likelihood that interference or collisions will result in message communication failure.

Accordingly, there exists a need for a system and method of implementing a protocol in a mesh network to facilitate high speed transmission of a message through the network for avoiding interference and collisions that are common in such prior art networks.

BRIEF DESCRIPTION

In an aspect, the exemplary embodiments include a system for determining a best path for dynamic tunneling in a mesh network, the system comprising: a first of a plurality of nodes in a mesh network to function as an originator station, where the first of the plurality of nodes is associated with an application that transmits high-density data packets; a second of the plurality of nodes in the mesh network to function as a target station and to receive data from the application; and a third of the plurality of nodes in the mesh network to function as a coordinating node, wherein the coordinating node collects path information from all nodes during normal network operation of the mesh network, determines a best path to transmit data to the target station based on the collected path information, and transmits the best path to the plurality of nodes in the mesh network for initiating transmission of the high-density data packets to the target station via the best path using a dynamic tunneling protocol, further wherein the collected path information includes a data rate associated with an ordered sequence of data packets transmitted by a transmitting node and received at the target station as part of a path during normal network operation of the mesh network, and the best path to transmit data to the target station based on the collected path information is based at least in part on the data rate.

In another aspect, the exemplary embodiments include a method for determining a best path for dynamic tunneling in a mesh network, the method comprising: collecting path information from a plurality of nodes in a mesh network during normal network operation of the mesh network, wherein a first of the plurality of nodes is associated with an application that transmits high-density data packets and a second of the plurality of nodes in the mesh network is to function as a target station for receiving the high-density data packets; determining a best path to transmit the high-density data packets to the target station based on the collected path information, wherein the collected path information includes a data rate associated with an ordered sequence of data packets that have been transmitted by a transmitting node and received at the target station as part of a path during normal network operation of the mesh network, and determining the best path to transmit the high-density data packets to the target station based on the collected path information is based at least in part on the data rate; and transmitting the best path to the plurality of nodes in the mesh network for initiating transmission of the high-density data packets to the target station via the best path, using a dynamic tunneling protocol.

In a further aspect, the exemplary embodiments include a non-transitory computer readable medium comprising computer executable steps that, when executed by a processor, perform a method for determining a best path for dynamic tunneling in a mesh network, the method comprising: collecting path information from a plurality of nodes in a mesh network during normal network operation of the mesh network, where a first of the plurality of nodes is associated with an application that transmits high-density data packets and a second of the plurality of nodes in the mesh network is to function as a target station for receiving the high-density data packets; determining a best path to transmit the high-density data packets to the target station based on the collected path information, wherein the collected path information includes a data rate associated with an ordered sequence of data packets that have been transmitted by a particular node and received at the target station as part of a path during normal network operation of the mesh network, and determining the best path to transmit the high-density data packets to the target station based on the collected path information is based at least in part on the data rate; and transmitting the best path to the plurality of nodes in the mesh network for initiating transmission of the high-density data packets to the target station via the best path, using a dynamic tunneling protocol.

BRIEF DESCRIPTION OF THE DRAWINGS

The above and still further features and advantages of embodiments of the present disclosure will become apparent upon consideration of the following detailed description of embodiments thereof, especially when taken in conjunction with the accompanying drawings, and wherein:

FIG. 7A and FIG. 7B illustrate a method for identifying or determining specific/best path to implement or initiate dynamic tunneling or network protocol in the mesh network, according to an aspect.

Figure 1:
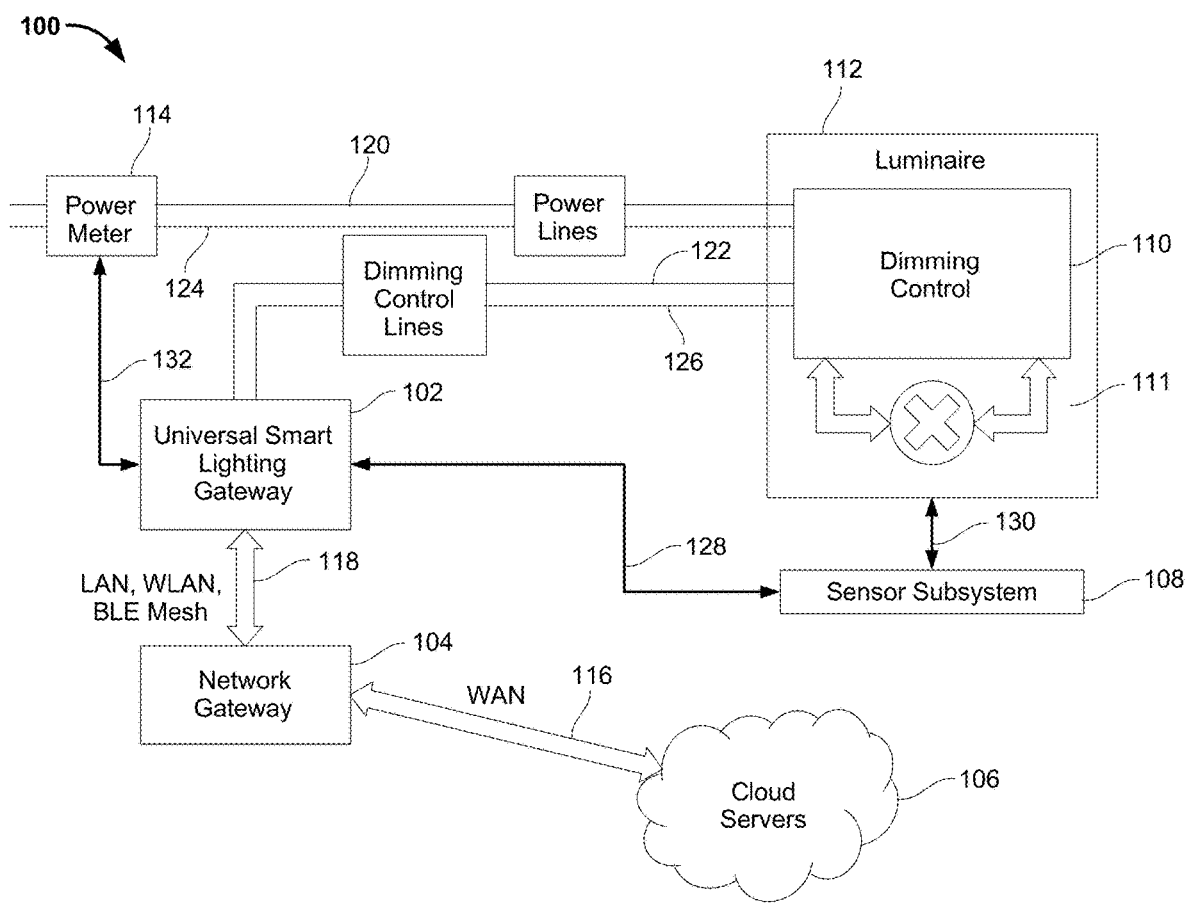
FIG. 1 illustrates a high-level system diagram of a luminaire IoT network which may be implemented in any wired or wireless or light communication mesh network system according to some embodiments.
Figure 2A:
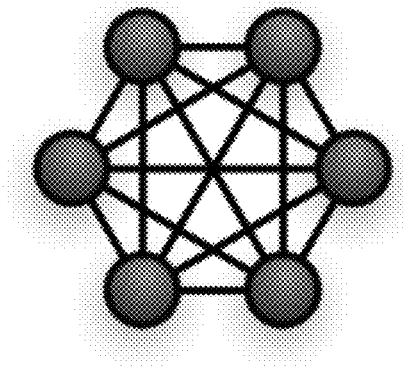
FIGS. 2A and 2B illustrate prior art fully and partially connected mesh networks implemented in any wired or wireless or visual light communication/dark light communication (VLC/DLC) communication-based network system.
Figure 2B:
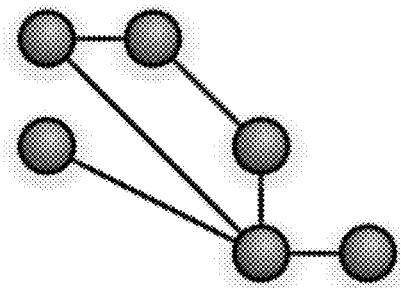

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments. The headings used herein are for organizational purposes only and are not meant to be used to limit the scope of the description or the claims. To facilitate understanding, reference numerals have been used, where possible, to designate like elements common to the figures.

DETAILED DESCRIPTION

Embodiments described herein relate generally to a system and method for managing and controlling a dynamic tunneling protocol in a mesh network. The system and method may provide for an interface to set up identification of an application that may require more bandwidth for high-density data packets. The setup information may store a location of a node associated with the application such as, but not limited to, an originator station. In some embodiments, the setup identification may be related to an automatic discovery and/or an auto-trigger setup for the application. Furthermore, controlling the dynamic tunneling protocol may be based on sending a start message to initiate the dynamic tunneling protocol and sending a close message to stop the dynamic tunneling protocol and to restart normal operation of the mesh network. The mesh network described herein may include any type of wired or wireless network or light communication network system. More particularly, the present embodiments relate to a system and method for implementing or initiating an interference mitigating protocol in a mesh network. Embodiments described herein will be illustrated below in conjunction with a mesh network incorporated in the luminaire IoT network system. However, the embodiments of the system and method may be implemented in any type of wired or wireless or light communication (VLC/DLC) network system.

The term "module" as used herein may refer to any known or later developed hardware, software, firmware, artificial intelligence, fuzzy logic, or combination of hardware and software that is capable of performing the functionality associated with that element. Also, while the present disclosure may be described in terms of exemplary embodiments, it should be appreciated those individual aspects of the embodiments described herein may be separately claimed.

The term "computer-readable medium" as used herein refers to any tangible storage and/or transmission medium that participate in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other non-transitory medium, magneto optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives may be considered a distribution medium equivalent to a tangible storage medium. When the computer-readable media is configured as a database, it may be understood that the database may be any type of database, such as relational, hierarchical, object-oriented, and/or the like. Further, while reference is made to various types of databases, it may be understood by one of ordinary skill in the art that all of the database functions may be stored within compartments of a single database, or within individual databases. In any event, the present specification may be considered to include a tangible storage medium or distribution medium and prior art-recognized equivalents and successor media, in which the software implementations of the present disclosure are stored.

Now referring to FIG. 1, a system 100 may relate to control of a luminaire driver and/or LED driver behavior by using a single variable in an IoT system. In some embodiments, the system may include at least one of a plurality of luminaires 112 and/or a plurality of LEDs 111 configured to communicate with at least one gateway 102, at least one single variable to control the luminaire driver and/or LED driver behavior, at least one sensor subsystem 108 configured to sense a plurality of color channels and monitor at least one change in environment in real time, at least one power meter 114 configured to measure power in real time, at least one dimming control protocol or dimming controller device or driver or interface 110 installed in a plurality of lighting devices (e.g., luminaires 112) and for controlling a plurality of dimming levels and/or dimming protocols of the plurality of lighting devices, and at least one server 106 (e.g. a cloud based server or a server located on a mesh network). Each of the plurality of luminaires 112 and/or LEDs 111 may include at least one luminaire driver and/or LED driver. Further, each of the plurality of luminaires 112 and/or LEDs 111 may comprise an inbuilt power source where the power source may include at least one of plurality of rechargeable batteries. The at least one sensor subsystem 108 and the at least one power meter 114 may be connected with the at least one gateway 102 along with the plurality of luminaires 112. The at least one sensor subsystem 108 may include at least two sensors. A first sensor may be an environment sensor dedicated to environment sensing and may be arranged such that it faces away from and/or extends in a downwardly fashion from the luminaire 112. A second sensor may be a color sensor such as a Red Green Blue (RGB) or Yellow Red Green Blue (YRGB) sensor arranged such that it faces the luminaire 112 directly. According to some embodiments, the at least one server 106 is configured to calculate and predict depreciation of the dimming levels of the plurality of luminaires 112 and/or LEDs 111. The sensor subsystem 108 may be configured to report and change display status information associated with the plurality of luminaires 112. The at least one sensor subsystem 108 may sense and capture environmental data in real time. In some embodiments, the at least one server 106 may be connected with the gateway 102 via at least one of a wired connection and a wireless or light communication network connection. For purposes of this disclosure, "environment" means generally and without limitation a space or area in which a luminaire or lighting system is installed. For purposes of this disclosure, "real time" generally means substantial concurrency without any particular timeframe or limitation.

In some embodiments, the gateway 102 may be capable of discovering a dimming control protocol installed in the plurality of lighting devices 112 and controlling at least one of the dimming levels and dimming protocols of the plurality of lighting devices 112. Further, the gateway 102 may be capable of controlling power to the luminaire 112 and may be capable of dimming the luminaire 112 to a minimal level or shutting it off completely. According to some embodiments, the at least one server 106 may be configured to calculate and predict depreciation of the dimming levels of the plurality of luminaires 112 and/or LEDs 111. Each sensor and/or sensor subsystem 108 may be configured to report and change display status information associated with the plurality of luminaires 112. The at least one sensor subsystem 108 and the at least one power meter 114 may each be connected with the at least one gateway 102. The at least one of the plurality of luminaires 112 and the plurality of LED's 111 may be physically connected to the gateway 102 via at least one dimming control interface such as dimming control lines 122, 126.

In some embodiments, the luminaire 112 may comprise a system that includes a single luminaire or multiple luminaires connected with a single common interface to power lines 120, 124. According to some embodiments, a power meter 114 may be connected electrically between the gateway 102 and the luminaire 112 and may be connected electrically to the luminaire 112 via the power lines 120, 124. The power meter 114 may be connected to the gateway 102 via the power meter interface 132.

The power meter 114 may be connected to an input line of the luminaire 112 in such a way that the power meter 114 measures electrical power drawn by the luminaire 112 at any given moment in real-time. According to some embodiments, the power meter 114 may connected to the gateway 102 to provide real time power measurements correlated 1-1 to luminaire power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used.

As illustrated in FIG. 1, the at least one sensor subsystem 108 may detect information related to the system 100 and the luminaires 112 by detecting current conditions of at least one of the luminaires 112. The current conditions of the luminaires 112 that may be detected are such as, but not limited to, a current color level or color/light intensity, the current temperature or voltage or humidity of the like, the current dimming level, and the like. The current condition information may be relayed to the gateway 102, which relays the information to the server 106 for storage, processing and the like. Thus, the sensor subsystem 108 may senses/detect a plurality of color channels and monitor at least one change in environment in real time. The up looking color sensor of the sensor subsystem 108 may identify an increase of fluctuation in the luminaire driver and/or LED driver or flickering. When the luminaire driver and/or LED driver fluctuates, the up looking color sensor may measure a change or disruption associated with the power supply or based on the power source. The information collected by the gateway 102 may include a current power level of the luminaires 112 as measured by the power meter 114 which may measure a current power level being used by the luminaires 112. The gateway 102 may be configured to receive information related to the plurality of luminaires 112 where the information includes the color/light intensity and at least one environmental condition sensed by the sensor subsystem 108. The sensor subsystem 108 may be arranged such that it connects via connection 130 to the luminaire 112 on one side and to the gateway 102 via a sensor interface 128 on another side. According to some embodiments, the connection 130 to the luminaire 112 may comprise a physical or wireless connection and may not be limited to a specific location. The location of the sensor subsystem 108 may be different for various types of sensors that are to be positioned.

The gateway 102 may be capable of communicating and handling the plurality of sensors and sensor protocols via its sensor interface 128. Embodiments in accordance with the present disclosure do not limit the type of hardware/wire/bus interfaces between the gateway 102 and the sensor subsystem 108, e.g., the number of wires, the type of wires or bus connectors or any wireless network or wireless protocol. In some embodiments, the connections may be as simple as analog interface connectors and/or electrical/digital bus connectors of any kind.

The sensor subsystem 108 may include an up looking sensor or combination of sensors directly facing the luminaires to measure multiple color channels ("color sensor"), as well as a low-resolution imaging/image sensor. As used herein, a low-resolution image sensor refers to a sensor that typically contains less than approximately 1200 pixels, for example, and without limitation, a 32×32 sensor. For example, and without limitation, the sensor may be capable of detecting and determining how many human individuals or other objects are in an environment in which the sensor is installed and the position and orientation of each individual/object. However, the sensor may not have enough resolution to identify or distinguish the individuals/objects, especially at certain distances from the individuals/objects. The low-resolution imaging sensor may include an array of sensors combined into a low-resolution imaging device, or a single Application-Specific Integrated Circuit (ASIC) that is an imaging sensor ("environment sensor"). The color sensor may be used to measure both the color content of a light source and the color/light intensity. The color sensor can be based on a single color or a plurality of colors.

According to some embodiments, the environment sensor may be used for monitoring the information to be collected about the environment of the light source 112. The environment sensor may include three or more different sensors, such as, a low-resolution image sensor, an ambient light sensor, and a temperature sensor. Embodiments in accordance with the present disclosure can use other sensors and more types of sensors to characterize the environment. Without limitation, this disclosure is referring to the three sensors included in the environment sensor as an "environment sensor". Further, without limitation, the environment sensor may include less or more sensors than are described herein. To be sure, the environment sensor provided as a part of the combination of sensors, may include sufficient/enough information to measure the environment, as described in this disclosure.

According to some embodiments, the combination of the environment sensor and the color sensor may be set into one of a single ASIC or a set of separate devices, all of which are also connected to the gateway 102. The sensors may be directed as follows: the color sensor faces the luminaires 112, and the environment sensor faces away from the luminaires in such a way that it monitors the environment. Real time measurements and assessments may be conveyed to the gateway 102 by the sensors that make up the sensor subsystem 108.

According to some embodiments, the environment and color sensors of the sensor subsystem 108 may be placed or connected to a fitting of the luminaire 112 and/or LED 111. An exact location of the sensors may not be fixed (e.g., two different luminaires by a same manufacturer of the same type of fitting and LED specifications may be assembled such that the sensor location is different relative to the surface and dimensions of the fitting). Thus, the location of the color and environment sensors on the fitting may not be limited.

According to some embodiments, the gateway 102 may control the dimming device 110 and change one or more of the dimming level, dimming protocol, and the color temperature of the luminaire 112 in luminaire devices that allow for color temperature control. In some embodiments, the gateway 102 may receive a set of directives or instructions for dimming setup and sensor measurements to occur at a specific day and time and/or on a specific schedule that repeats itself. According to some embodiments, the sensors of the sensor subsystem 108 may be programmed via the gateway 102 such that they will provide data only in cases where color/light intensity is outside a predefined range. The gateway 102 may be controlled such that it executes measurements only when environment measurements are in a certain range, as well as when the dimming level is in a certain range. According to some embodiments, the dimming parameters, the environmental reading parameters and the sensor parameters and reading setup, may all be controlled from outside of the gateway 102 via cloud servers 106 connecting to the gateway 102. A person of ordinary skill in the art may appreciate that the control described here allows the system to set up a miniature-controlled environment in which the color/light intensity of the luminaire 112 can be measured.

The system 100 may continuously receive real-time performance measurements from the sensor devices of the sensor subsystem 108 via the sensor interface 128 and power measurements from the power meter 114 via the power meter interface 132. According to some embodiments, the gateway 102 sends these readings in a compressed format to the cloud servers 106. According to some embodiments, the gateway 102 is configured to relay the information collected by the sensor subsystem 108 to the at least one server 106 for processing, storage, calculating, compilation, comparing, and the like. According to some embodiments, the server 106 includes a processor configured to receive and use the information to calculate and predict a life expectancy of the luminaires 112 and/or LEDs 111 and to generate and relay a life expectancy report to a user. The compressed format may include two types of messages, namely a baseline message set and an updates message set. In general, a message set may comprise any one of the baseline message and/or set of messages and the updates message set. According to some embodiments, the baseline message set may include the full sensor readings, power level readings and current dimming state. According to some embodiments, the updates message set may include changes or differentiations from a previous message set. The baseline message set may be sent upon major change, such as a change in the dimming level, while the updates message set may be sent at regular intervals. According to some embodiments, the updates message set includes readings that are significantly different from a previous set. In one embodiment, sensor readings may be averaged over the time interval between two consequent updates message sets.

The system 100 may include a backhaul interface 118 for connecting the gateway 102 and a network gateway 104. In some embodiments, the backhaul interface 118 comprises a mesh network. In some embodiments, the backhaul interface 118 may comprise a wired or wireless Local Area Network (LAN), including one or more of Mesh Bluetooth Low Energy (Mesh BLE), Smart Mesh, Bluetooth Mesh, WLAN, ZigBee, and/or Ethernet LAN. The backhaul interface 118 may communicate via a communication protocol such as, but not limited to, a Mesh BLE protocol. The gateway 102 may be connected to the back-end network 104 via LAN, WLAN, WAN, Mesh BLE radio network or other means. This connection may allow another device on the network, local to the gateway or via WAN in the cloud, to handle the lumen prediction process. Thus, an entire luminaire half-life prediction process may be distributed between physical machines or on a single machine, local or remote to the gateway 102.

Embodiments in accordance with the present disclosure provide the system 100 that includes the gateway 102, which can interface with other control systems or devices via wired connections, Ethernet connections, wireless connections or any combination thereof, and can receive control messages that direct the gateway 102 to change a dimming level via its dimming interface/control/driver 110. This interface or plurality of interfaces comprise the backhaul interface 118 of the gateway. Embodiments in accordance with the present disclosure provide a system in which the backhaul protocol is associated with a mesh network and is capable of delivering dimming directions to the gateway 102 as well as receiving sensor and power level readings via the sensor subsystem 108 from the gateway 102 associated with the luminaires 112 managed by this gateway 102.

According to some embodiments, the gateway 102 may be connected to the network gateway 104, which may reside between the local networks and a wide area network (WAN) 116. In some embodiments, the WAN 116 may connect the gateway 102 to cloud servers 106 for operational and management interfaces. According to some embodiments, the gateway 102 may be configured to control a plurality of dimming levels and/or dimming protocols of the lighting devices 112 and is capable of communicating sensor readings and the dimming level as well as a power reading of the luminaire 112 over the wired/wireless network(s) 118 and via the Wide Area Network ("WAN") 116 to the server 106 for processing.

Embodiments in accordance with the present disclosure provide that the cloud servers 106 may be continuously receiving performance measurements from the plurality of gateways 102. In some embodiments, the cloud servers 106 provide each gateway 102 with a table of reading directions that include the correct sensor reading thresholds for specific dimming levels associated with the specific luminaire 112. Thus, the gateway 102 may only need to report changes or deviations from this internal table to the cloud servers 106. Using this method, the system 100 may further reduce an amount of information that needs to be transmitted over the gateway 102 backhaul interface 118. In this way, the cloud server applications may control the rate of information sent by the gateway 102 and more accurately predict the LED 111 behavior.

The system 100 may send sensor readings and other information over the backhaul interface 118 to the cloud server 106 at random times. According to some embodiments, this may allow for better utilization of the backhaul interface 118. In some embodiments, messages being sent at random time periods during the day may include a correct time stamp of the measurement or reading and the sensor reading (e.g., dimming level). Because of a delay in transmission, the message receiving time at the cloud server 106 may not correlate with the actual time at which the measurement is taken. Thus, tagging the measurement correctly with a time of measurement may be required. In general, the use of a mesh network as the backhaul interface 118 and the likely numerous gateways 102, luminaires 112 and sensors per gateway 102 may provide for an opportunity to implement an interference mitigating protocol to ensure more timely and successful message and data packet delivery for managing the luminaire IoT system.

Figure 3:
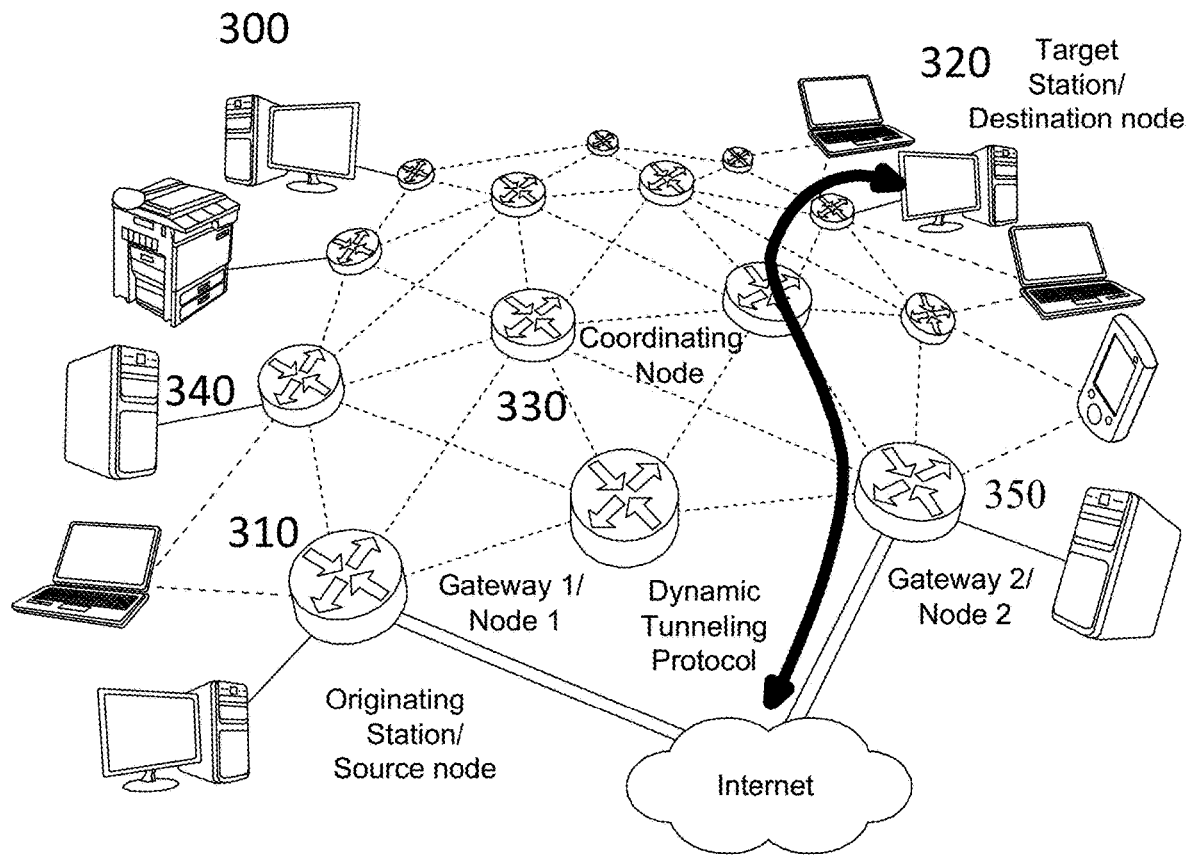
FIG. 3 is a high-level system diagram of a mesh network implemented in any wired or wireless or light (VLC/DLC) based communication network system, according to an aspect.

FIG. 3 is a high-level system diagram of a mesh network 300 implemented in any wired or wireless network system, according to certain exemplary disclosed embodiments. The exemplary disclosed embodiments may relate to a system for managing a dynamic tunneling protocol in a mesh network and determining a best path through the mesh network for implementing the dynamic tunneling protocol. In some embodiments, the mesh network 300 comprises at least one network server 340 connected with a gateway 350 and at least one tunneling network routing protocol. In some embodiments, the system may be configured to determine a specific or best path to transmit data packets via a tunneling network protocol from an originator station 310 to a target station 320. The system may be further configured to identify and collect path information from all nodes in a mesh network 300 during normal operation of the mesh network 300. For example, the path information that is collected may include a rate that data packets are received in an ordered sequence based on measuring one or more, or combination of factors such as, time of arrival of the data packets, time of origination of the data packets, and/or a distance of the path from the originator station 310 to the target station 320. In some embodiments, the system may be configured to identify one or more high density data packets originated from the originator stations 310. In some embodiments, the collection of information, such as, a time of arrival while collecting path information for messages from every node during normal operation of the mesh network 300. The collected information may also include a time of origination and may measure a time of arrival and measure the path. The mesh network 300 may be further configured to assign and/or store the specific or best path via one or more nodes for transmission of the one or more high density data packets from the originator station 310 to the target station 320 based on the collected path information. The best path information may be stored at a coordinating node 330 that may not only store information about best paths through the mesh network 300 but may also send a start message to initiate a dynamic tunneling protocol and may send a close message to stop the dynamic tunneling protocol and to restart normal operation of the mesh network 300.

In some embodiments, such as illustrated in FIG. 3, a best path may include exiting and reentering the mesh network 300 via the internet.

Figure 4:
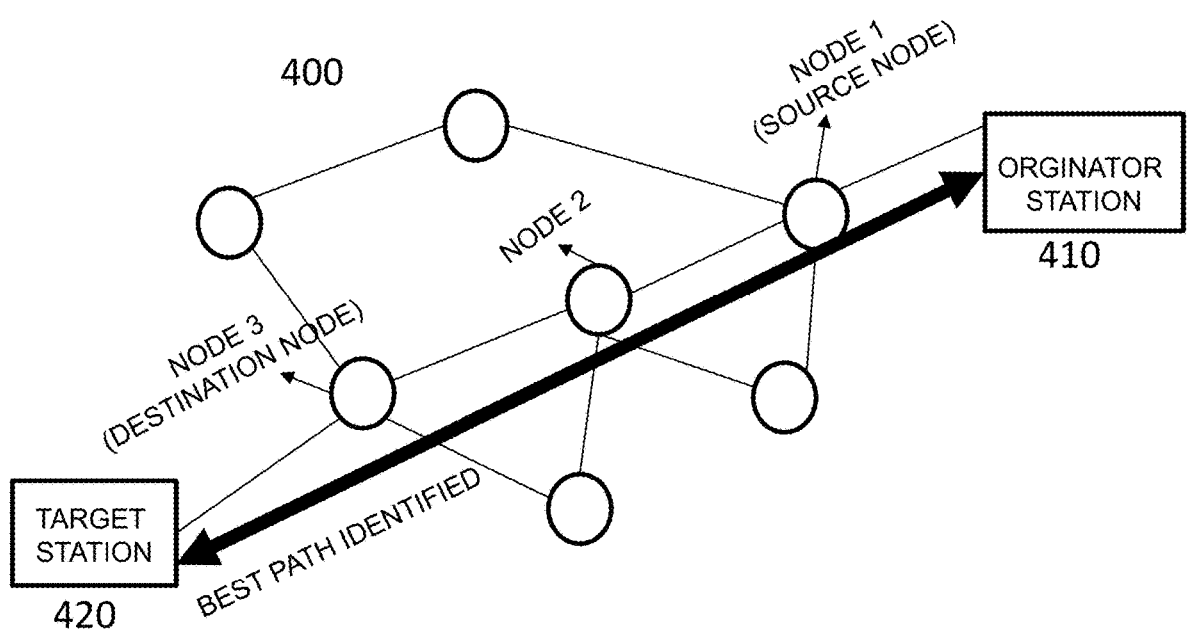
FIG. 4 is a diagram of an identified best/specific path for transferring data packets between an originator station to a target station in the mesh network, according to an aspect.

The mesh network 300 may be configured to manage multiple applications and profiles for implementing a dynamic tunneling operation in the mesh network 300. With reference now to FIG. 4, and exemplary diagram of assigned nodes for transferring data packets between an originator station 410 (e.g., data associated with a high bandwidth application) to a target station 420 in a mesh network 400 is shown.

In some embodiments, multiple applications may be used to manage dynamic tunneling operations. To manage dynamic tunneling operations, a management module (e.g., such as coordinating node 330 of FIG. 3) may provide an interface to set up identification for one or more high bandwidth applications and to associate them with a specific node (e.g., a node location within the mesh network). In some embodiments, an automatic discovery mechanism may automatically discover the application and a node that the application is associated with (e.g., where the application is installed or a node that the application communicates through). For example, in a case that a high definition camera is connected to in the mesh network, this system may identify this device as being associated with a high bandwidth application that transmits high-density packets (e.g., high definition video).

In some embodiments, the high bandwidth application may utilize a trigger that indicates to the mesh network that the application needs more bandwidth. In some embodiments, the trigger may be implemented by transmitting a message that the application needs more bandwidth where the message may further indicate a duration (e.g., how long the application will require more bandwidth). The message may be received at a node (e.g. a coordinating node) and the node may initiate dynamic tunneling operations. For example, the node may send a tunneling start message with a timeout to all of the nodes in the mesh network. The tunneling start message may include a best path for data to be transmitted.

The tunneling start message, also called a setup message, may be sent from a coordinating node or, in some embodiments, the tunneling start message may be transmitted directly from an originator station or an application residing on one or more nodes that is in need of high bandwidth. In some embodiments, the tunneling start message may be received at the nodes assigned to the best path thereby allowing tunneling to start and for messages to be transmitted along the best path at a higher bandwidth. The system may terminate the dynamic tunneling protocol based on a tunneling close message once the high-density data packets have reached their destination (e.g., a target node or gateway). In some embodiments, the tunneling start message may be received at nodes that are not associated with the best path and in response to receiving the tunneling start message, the nodes that are not associated with the best path may remain silent and may not transmit or forward messages. Messages received at the nodes that are not associated with the best path may be stored in a cache for later transmission or may simply be dropped.

Figure 5:
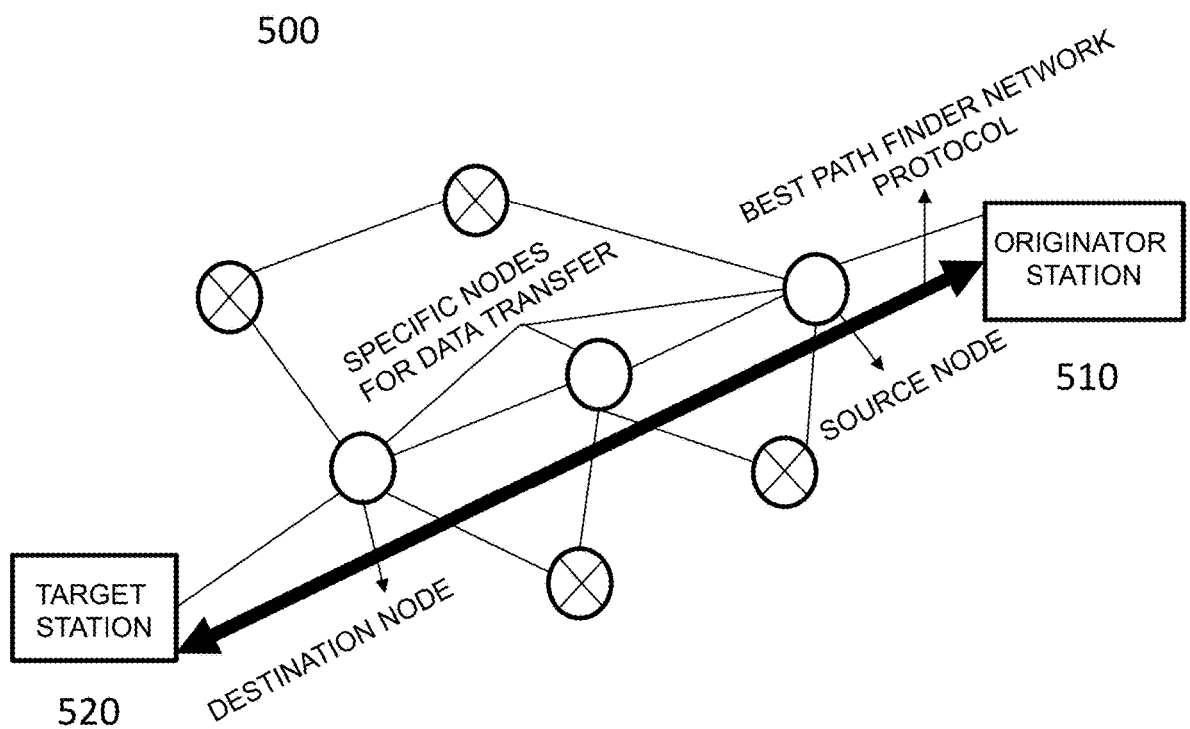
FIG. 5 is a diagram of an initiated dynamic tunneling or network protocol in the identified best/specific path for transferring data packets between an originator station to a target station in the mesh network, according to an aspect.
Figure 6:
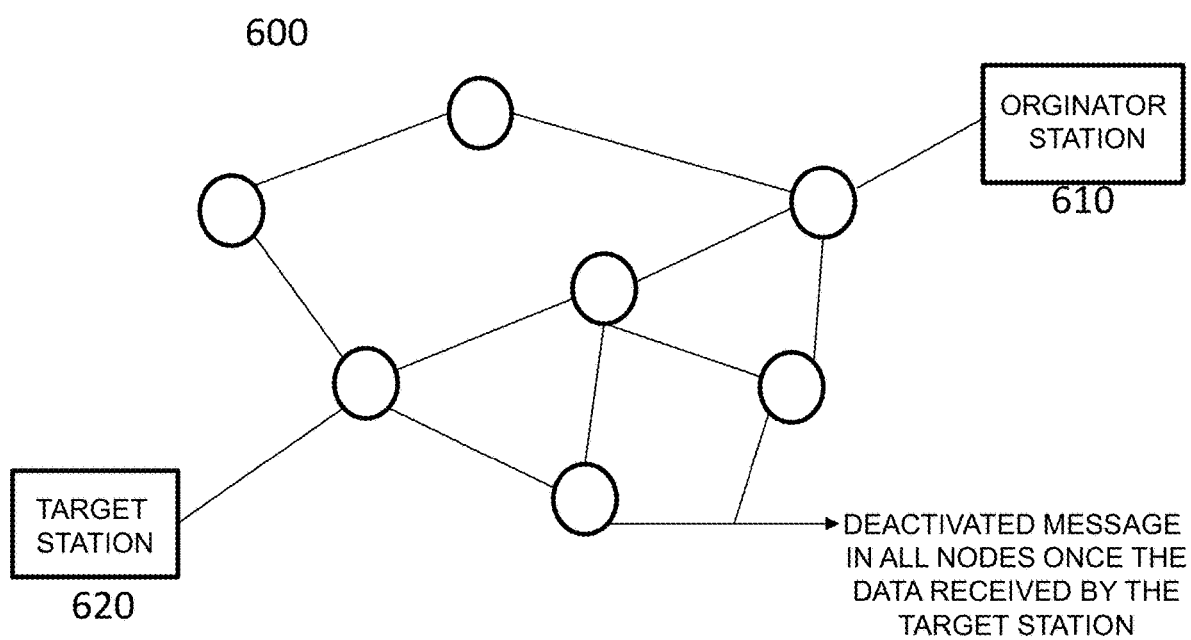
FIG. 6 is a diagram of re-activated nodes after transferring data packets between an originator station to a target station in the mesh network, according to an aspect.

FIG. 5 may illustrate an example of a diagram associated with an initiated dynamic tunneling protocol via a message generated for transferring data packets between an originator station 510 to a target station 520 in the mesh network 500. In some embodiments, the generated message may be configured to activate the specific nodes in the best path and to inactivate the nodes other than the specific nodes until the high-density data packets have been received by the target station. FIG. 6 may illustrate an example of a diagram associated with re-activated nodes after transferring data packets between an originator station 610 to a target station 620 in the mesh network 600. In some embodiments, the system may be further configured to re-activate all the nodes in the mesh network once the high-density data packets have been received by the target station. Further, the system may maintain pre-determined best paths via specific nodes to receive the high-density data packets at all times from one or more originator station to one or more target station.

The mesh network 600 disclosed herein may include, but is not limited to, a wired or wireless mesh network, a set of wired switches, a wireless mesh, or any light (VLC/DLC) communication network. In some embodiments, the dynamic tunneling protocol may be initiated after determining the best path through the mesh network. However, in some embodiments, the dynamic tunneling protocol may be initiated in conjunction with determining the best path through the mesh network and the best path may be dynamically determined. To determine the best path, the system may be configured to identify and collect path information from all nodes during normal operation of the mesh network. For example, the system may collect data rates associated with an ordered sequence of data packets that have been received by measuring one or more factors associated with the data packets. In some embodiments, the factors may include information such as, but not limited to, times of arrival of the data packets, time of origination of the data packets, and the distance of the path from the originator station to the target station. The system may be configured to assign the best path for transmitting high-density bandwidth information based on the collected path information. In some embodiments, the system further constantly measures times of arrival associated with data packets during transmission of high-density data packets so that the best path may be dynamically changed during transmission of the packets when a slowdown associated with a specific node is determined. In a case of a slowdown, the system may generate a second setup message that indicates an alternate path (e.g., an alternate best path) The nodes may include, but are not limited to, any gateway, router, or originator/application that transmits high-density memory data packets such as images, video streaming, or HD videos, etc.

In some embodiments, the system may be configured to generate a setup message across the nodes in the mesh network to enable the best path for transferring high-density data packets using a dynamic tunneling protocol. The setup message may include a forwarding ID of a set of specific nodes using normal protocol interfaces to transfer data packets/high-density data packets. In some embodiments, the setup message may include a hop by hop ID to transfer the data packets between the specific nodes (e.g. instruction to send the message from node A to node B and then to node C). The system may optionally be configured to transmit a separate control message to pause all activity which is particularly applicable for wireless and light-based mesh network systems. In some embodiments, the best path of the message that is indicated in a header of the data packets may be truncated after every hop in the implemented mesh network. For example, after being sent from node A to node B, the header may be truncated to remove node B prior to the message being sent to node C.

In some embodiments, when the setup message reaches the node associated with the high bandwidth application, the sending of messages is initiated at a high bandwidth where the data packets will be forwarded via the nodes associated with the best path. In one embodiment, the system is further configured to re-activate all the nodes in the mesh network after the high-density data packets are received by the target station. Further, the system may maintain pre-determined best paths via specific nodes to receive the high-density data packets at all times from one or more originator stations to one or more target stations. In some embodiments, except from the identified nodes associated with the best path, the remaining nodes of the mesh network may stop sending or forwarding messages after an allowed time with some delta constant.

Figure 7:
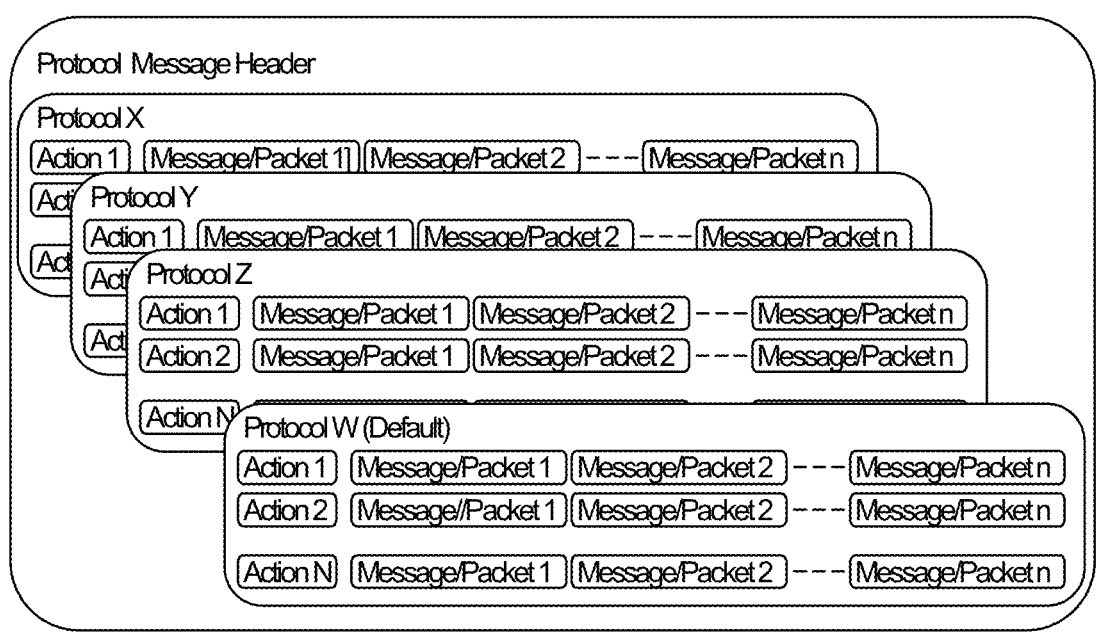
FIG. 7 illustrates an embodiment of a protocol for forwarding message list and packet structure for the gateway, according to an aspect.

FIG. 7 illustrates an embodiment of a data structure associated with a protocol for forwarding a message list and packet structure. The data structure may be designed such that it is easy to traverse the protocol options and pick a correct protocol during the dynamic tunneling process. The protocol list includes N protocols, where N can be any number. In an embodiment, each protocol (X, Y, Z W) may include directives to the gateway (e.g., gateway 102) to setup the specific protocol interface (e.g., high bandwidth messages, sequence/serial number and other required information as dictated by the protocol standard interface). Further, each protocol may include a set of directives/actions numbered 1-N. The tunneling process may use these directives to take actions like sending a message or truncating the messages. According to some embodiments, each action in the list may be associated with a list of node IDs, sequence/serial number of the message for the forwarding nodes, memorizing the forwarding nodes, or number of messages received. In some embodiments, at least one of the protocols, without limitation, may be marked as a default protocol W. According to some embodiments, the default protocol is the protocol to which the gateway will default into when no other protocol is activated, or during normal operations of the nodes.

Figure 7B:
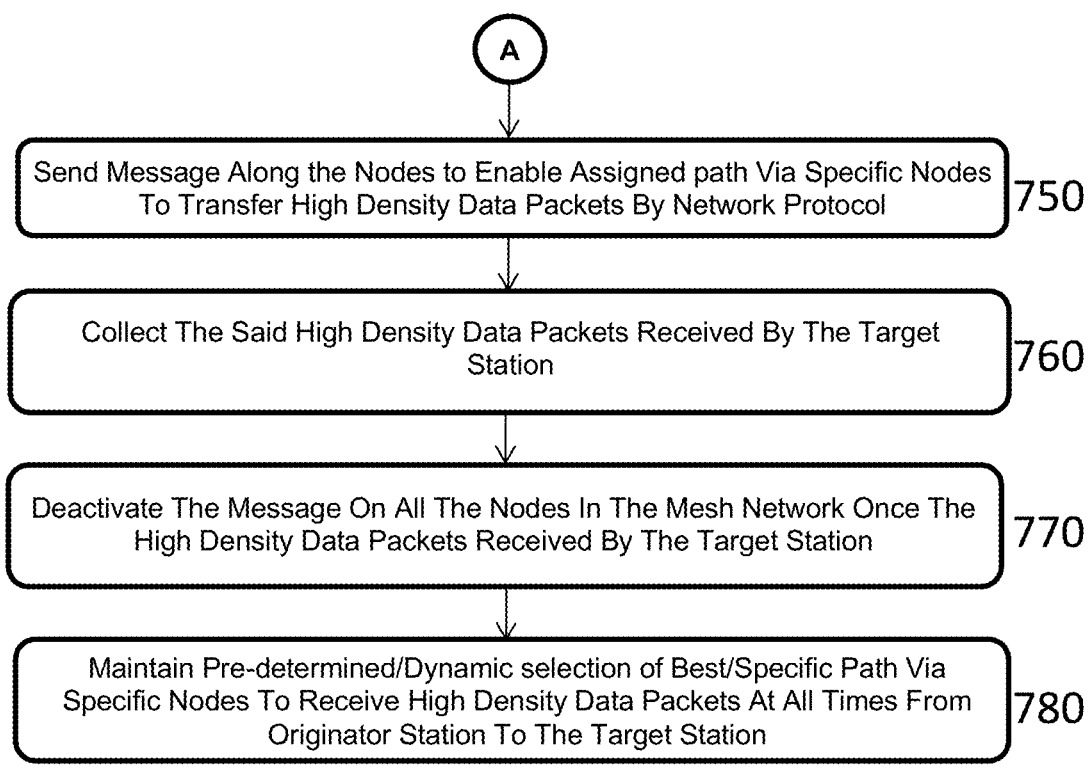

FIG. 7A and FIG. 7B illustrate a method 700 for identifying or determining a best path to transfer data in the mesh network. In some embodiments, a method for identifying or determining specific/best path to implement or initiate a network protocol via network hardware devices in the mesh network is also disclosed, according to the embodiments described herein. At 710, a best path to receive data packets is determined. The best path may be determined via initiating a network protocol from an originator station to a target station. For determining the best path, a time of arrival of data packets may be measured while collecting path information for messages from every node during normal operation of the mesh network. The collected path information may also include a time of origination, a measured time of arrival and a measured path distance. Thus, at 720, path information may be identified and collected. For example, path information may be identified and collected from all nodes during normal operation of the mesh network by measuring a data rate associated with receiving an ordered sequence of data packets. The data rate may be based on measuring i) a time of arrival of the ordered sequence of data packets, ii) a time of origination of the ordered sequence of data packets and iii) a distance of a path from an originator station to a target station that the ordered sequence of data packets travel. In some embodiments, a message having a header that indicates a|b|c|d| (e.g., the best path) may be received at a node where a, b, c and d identify the nodes that are indicated to forward the message. At 730, a high-density data packet originated from one or more originator stations may be identified. At 740, the best path may be assigned one or more nodes to receive high-density data packets from the originator station to the target station based on the collected path information. A message may be generated and sent across the nodes of the mesh network to enable the best path for transferring high-density data packets using a dynamic network protocol at 750. Further, the message may be configured to activate the specific nodes dynamically and the high-density data packets may be received at the target station at 760. At 770, the dynamic network protocol may be deactivated on all nodes in the mesh network once the high-density packets have been received by the target station. At 780, determined (e.g., dynamically determined best paths) and predetermined best paths for receiving high-density data packets between one or more originator stations to one or more target stations may be stored and retained for future transmissions. Saving determined and predetermined best paths may further increase efficiency and throughput of the mesh network. The path information may be stored at the coordinating node 330. In a case that a coordinating node 330 is offline, a backup coordinating node that stores a backup of the best path information may be used for initiating the dynamic tunneling protocol.

In one embodiment, the system and method further comprises a transmission means for changing the transmission of data packets along a different path and/or at a different time based on the current and historical data associated with a current path such that the data packets are received in the ordered sequence at the target station in the mesh network. In some embodiments, the system further comprises storage means for storing the current (e.g. real time or near real time) and historical data in a data storage (e.g. a database, a table, etc.). In one embodiment, the system further comprises a calculation means (e.g. a processor) for determining factors such as, but not limited to, the time of arrival, time of origination of the data packets along a plurality of different paths between the originating station and the target station in the mesh network. In some embodiments, the system further comprises calculation means (e.g., the processor) for measuring a time of transmission of data packets along a plurality of different paths in an ordered sequence between the originating station and the target station in the mesh network. In some embodiments, the system further comprises selecting means (e.g., the processor) for selecting a best path through the mesh network for transferring one or more high-density data packets between the originating station and the target station.

In some embodiments, the system comprises plurality of nodes wherein at least one of the plurality of nodes comprises a coordinating node that is used to activate specific path/route information to other nodes on request. Further, in some embodiments, the system comprising plurality of nodes may use the coordinating node to deactivate a best path and/or its associated information on request.

In an embodiment, the system may be configured to reduce a number of hops through the mesh network by initiating the dynamic tunneling network protocol along the specified best path. In some embodiments, the specified best path may be associated with more than one source node and/or more than one destination node in the mesh network. The specified best path may be assigned by a coordinating node, one or more targeting stations in the mesh network or by one or more originating stations in the mesh network.

The best path may be selected with consideration to the information on the distances between the originating station and the target station in the mesh network. In another embodiment, each path through the mesh network may be selected with consideration to the information on the number of nodes between the originating station and the target station in the mesh network. In some embodiments, the mesh network comprises a coordinator node, wherein the coordinator node is configured to store the path information on the distances between the originating station and the target station in the mesh network. In some embodiments, the coordinator node may be configured to store the route information associated with the number of nodes between the originating station and the target station in the mesh network. In some embodiments, the stored path/route information may change in response to messages generated by the coordinator node.

In some embodiments, the originating station may not be the coordinator node and the originating station may request path information to a target station node via one or more coordinator nodes. As such, the coordinator nodes may send path information to the originating station. In some embodiments the coordinator node may send best path information after initiating a dynamic tunneling protocol to receive high-density data and the coordinator node may comprise any one of assigned nodes during deployment of mesh network. In various embodiments, the coordinator node may comprise one or more gateways, one or more routers, or any of the network hardware devices.

In some embodiments, the originating station/source node may not be the coordinator node, the originating station/source nodes may request path/route information from a target station/destination nodes via one or more coordinator nodes. Thereby, the coordinator nodes may send path information to the originating station/source nodes. In some embodiments, the coordinator node may send specific path information via initiating a dynamic interference mitigating protocol to receive high-density data packets from applications such as video/image data to the originating station/source nodes. In some embodiments, the coordinator node may comprise any one of assigned nodes during deployment of the mesh network. In some embodiments, the coordinator node may comprise one or more gateways, one or more routers, or any of the network hardware devices.

The coordinating node may comprise a processor, such as one or more commercially available Central Processing Units (CPUs) in the form of one-chip microprocessors, coupled to a communication device configured to communicate via a communication network. The processor may communicate with a memory/storage device that stores data. The storage device may comprise any appropriate information storage device, including combinations of magnetic storage devices (e.g., a hard disk drive), optical storage devices, and/or semiconductor memory devices. The storage device may store a program and/or processing logic for controlling the processor. The processor performs instructions of the programs and thereby operates in accordance with any of the embodiments described herein. The programs may be stored in a compiled, compressed, uncompiled, and/or encrypted format or a combination. The programs may furthermore include other program elements, such as an operating system, a database management system, and/or device drivers used by the processor to interface with peripheral devices.

The present disclosure, in various embodiments, configurations and aspects, include components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, include providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, exemplary aspects lie in less than all features of a single foregoing disclosed embodiment, configuration, or aspect. Thus, the following claims are hereby incorporated into this Detailed Description, with each claim standing on its own as a separate exemplary embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for determining a best path for dynamic tunneling in a mesh network comprising:
   at least one network server connected with a gateway and
      at least one tunneling network routing protocol, wherein the system is configured to identify and collect path information from all nodes in the mesh network during normal operation of the mesh network, a first of a plurality of nodes in a mesh network to function as an originator station, wherein the first of the plurality of nodes is associated with an application that transmits high-density data packets;

a second of the plurality of nodes in the mesh network to function as a target station and to receive data from the application; and a third of the plurality of nodes in the mesh network to function as a coordinating node, wherein the coordinating node collects path information from all nodes during normal network operation of the mesh network, determines a best path to transmit data to the target station based on the collected path information, and transmits the best path to the plurality of nodes in the mesh network for initiating transmission of the high-density data packets to the target station via the best path using a dynamic tunneling protocol, wherein the coordinating node provides an interface to set up identification of one or more high bandwidth applications and to associate them with a specific node, wherein the high bandwidth application utilizes a trigger to indicate to the mesh network that the application need more bandwidth, wherein the trigger is implemented by transmitting a message that the application needs more bandwidth and indicates a duration, wherein the dynamic tunneling protocol is based on sending a start message to initiate the dynamic tunneling protocol and sending a close message to stop the dynamic tunneling protocol and to restart normal operation of the mesh network, wherein the collected path information includes a data rate associated with an ordered sequence of data packets transmitted by a transmitting node and received at the target station as part of a path during normal network operation of the mesh network, and the best path to transmit data to the target station based on the collected path information is based at least in part on the data rate, and wherein the system further constantly measures times of arrival associated with data packets during transmission of high-density data packets so that the best path may be dynamically changed during transmission of the packets when a slowdown associated with a specific node is determined.

2. The system of claim 1, wherein the data rate is measured by one or more of a time of arrival of the ordered sequence of data packets, a time of origination of the ordered sequence of data packets, and a distance of the path from the originator station to the target station.

3. The system of claim 1, wherein the best path includes at least in part nodes associated with a path having a relatively higher data rate.

4. The system of claim 1, wherein the coordinating node functions to determine the best path to transmit data to the target station either before initiating the dynamic tunneling protocol, during or after initiating the dynamic tunneling protocol, or from a pre-determined best path.

5. The system of claim 4, wherein the coordinating node dynamically determines one or more alternate best paths at a single time or at several times including before initiating the dynamic tunneling protocol, during or after initiating the dynamic tunneling protocol, or from a pre-determined best path.

6. The system of claim 1, wherein the best path comprises a list of forwarding nodes in the mesh network and wherein in response to transmitting the best path to the plurality of nodes in the mesh network, each node of the plurality of nodes that is not associated with the best path will stop transmitting during a time duration that the high-density data packets will be transmitted.

7. The system of claim 2, wherein the best path is based on one or a combination of current data associated with normal operation of the mesh network and historic data associated with normal operation of the mesh network.

8. The system of claim 7, wherein in a case that the current data indicates that an alternate path would be faster than the best path, the coordinating node generates a second message in response to the application requiring more bandwidth where the message indicates an alternate path.

9. The system of claim 1, wherein the best path includes exiting and reentering the mesh network via the internet.

10. The system of claim 1, wherein the mesh network is a wired or wireless or visual light communication/dark light communication (VLC/DLC) based network system.

11. A method for determining a best path for dynamic tunneling in a mesh network comprising:

identifying and collecting path information from a plurality of nodes comprising at least three nodes in a mesh network comprising at least one network server connected with a gateway and at least one tunneling network routing protocol during normal network operation of the mesh network, wherein a first of the plurality of nodes is associated with an application that transmits high-density data packets, a second of the plurality of nodes in the mesh network is to function as a target station for receiving the high-density data packets, a third of the plurality of nodes in the mesh network to function as a coordinating node, wherein the coordinating node identifies and collects path information from all nodes during normal network operation of the mesh network, the coordinating node determines a best path to transmit the high-density data packets to the target station based on the collected path information, wherein the determining the best path is based at least in part on path information including one or a combination of current data associated with normal operation of the mesh network, historic data associated with normal operation of the mesh network, and a pre-determined best path maintained by the coordinating node, wherein the collected path information includes a data rate associated with an ordered sequence of data packets that have been transmitted by a transmitting node and received at the target station as part of a path during normal network operation of the mesh network, and determining the best path to transmit the high-density data packets to the target station based on the collected path information is based at least in part on the data rate; and transmitting the best path to the plurality of nodes in the mesh network for initiating transmission of the high-density data packets to the target station via the best path, using a dynamic tunneling protocol comprising sending a start message to initiate the dynamic tunneling protocol and sending a close message to stop the dynamic tunneling protocol and to restart normal operation of the mesh network, and further comprising the coordinating node providing an interface to set up identification of one or more high bandwidth applications and to associate them with a specific node utilizing a trigger to indicate to the mesh network that the application needs more bandwidth implemented by transmitting a message that the application needs more bandwidth and indicates a duration.

12. The method of claim 11, wherein the method further comprises:
   determining from the current data that an alternate path would be faster than the best path;
   generating with the coordinating node a second message in response to the application requiring more bandwidth; and
   transmitting the alternate path to the plurality of nodes in the mesh network.

13. The method of claim 11, wherein the transmitting the best path step includes transmitting a message with the best path in a header of the message and the best path header includes a list of forwarding nodes in the mesh network, and further comprising:
   truncating the best path header by removing from it the list of forwarding nodes each forwarding node that received the message when the forwarding node receives the message.

14. The method of claim 11, wherein collecting path information includes measuring or determining at least one of data rates, times of arrival of data packets, times of origination of data packets, and distances of paths from the originator station to the target station.

15. The method of claim 11, wherein the mesh network is a wired or wireless or visual light communication/dark light communication (VLC/DLC) based network system.

16. The method of claim 11, wherein the determining the best path step includes identifying nodes associated with a path having a relatively higher data rate.

17. A non-transitory computer readable medium comprising computer executable steps that, when executed by a processor, perform a method for determining a best path for dynamic tunneling in a mesh network comprising:
   identifying and collecting path information from a plurality of nodes comprising at least three nodes in a mesh network comprising at least one network server connected with a gateway and at least one tunneling network routing protocol during normal network operation of the mesh network,
      wherein a first of the plurality of nodes is associated with an application that transmits high-density data packets, a second of the plurality of nodes in the mesh network is to function as a target station for receiving the high-density data packets, a third of the plurality of nodes in the mesh network to function as a coordinating node,
      wherein the coordinating node identifies and collects path information from all nodes during normal network operation of the mesh network,
   the coordinating node determines a best path to transmit the high-density data packets to the target station based on the collected path information,
      wherein the determining the best path is based at least in part on path information including one or a combination of current data associated with normal operation of the mesh network, historic data associated with normal operation of the mesh network, and a pre-determined best path maintained by the coordinating node,
      wherein the collected path information includes a data rate associated with an ordered sequence of data packets that have been transmitted by a particular node and received at the target station as part of a path during normal network operation of the mesh network, and determining the best path to transmit the high-density data packets to the target station based on the collected path information is based at least in part on the data rate; and
   transmitting the best path to the plurality of nodes in the mesh network for initiating transmission of the high-density data packets to the target station via the best path, using a dynamic tunneling protocol comprising sending a start message to initiate the dynamic tunneling protocol and sending a close message to stop the dynamic tunneling protocol and to restart normal operation of the mesh network
   and further comprising the coordinating node providing an interface to set up identification of one or more high bandwidth applications and to associate them with a specific node utilizing a trigger to indicate to the mesh network that the application needs more bandwidth implemented by transmitting a message that the application needs more bandwidth and indicates a duration.

18. The medium of claim 17, wherein the method step of determining the best path is based at least in part on one or a combination of current data associated with normal operation of the mesh network and historic data associated with normal operation of the mesh network, the method further comprising:
   determining from the current data that an alternate path would be faster than the best path;
   generating with the coordinating node a second message in response to the application requiring more bandwidth; and
   transmitting the alternate path to the plurality of nodes in the mesh network.

19. The medium of claim 17, wherein the method step of determining the best path includes identifying nodes associated with a path having a relatively higher data rate.

* * * * *